(12) United States Patent
Clayton et al.

(10) Patent No.: US 6,901,028 B2
(45) Date of Patent: May 31, 2005

(54) MARINE SEISMIC SURVEY APPARATUS WITH GRAPHICAL USER INTERFACE AND REAL-TIME QUALITY CONTROL

(75) Inventors: David A. Clayton, Seabrook, TX (US); Shyam Kutty, Houston, TX (US)

(73) Assignee: Input/Output, Inc., Stafford, TX (US)

( * ) Notice: Subject to any disclaimer, the term of this patent is extended or adjusted under 35 U.S.C. 154(b) by 270 days.

(21) Appl. No.: 10/368,699

(22) Filed: Feb. 18, 2003

(65) Prior Publication Data

US 2004/0022125 A1 Feb. 5, 2004

Related U.S. Application Data

(60) Provisional application No. 60/363,984, filed on Mar. 14, 2002.

(51) Int. Cl.$^7$ .............................. G01V 1/52; H04B 17/00
(52) U.S. Cl. ............................. 367/68; 367/13; 702/16
(58) Field of Search ............................. 367/13, 15, 38, 367/59, 68; 340/517; 702/2, 16

(56) References Cited

U.S. PATENT DOCUMENTS

| 4,246,652 | A | 1/1981 | Khan et al. .................... 367/42 |
| 4,476,553 | A | 10/1984 | Ziolkowski et al. ......... 367/144 |
| 4,757,482 | A | 7/1988 | Fiske, Jr. et al. ............ 367/144 |
| 4,852,071 | A | 7/1989 | Otto ............................ 367/144 |
| 4,868,794 | A | 9/1989 | Ziolkowski et al. .......... 367/23 |
| 5,184,329 | A | 2/1993 | Regnault et al. .............. 367/23 |
| 5,200,927 | A | 4/1993 | Cretin et al. .................. 367/13 |
| 5,212,669 | A | 5/1993 | Jenkins ........................ 367/144 |
| 5,530,678 | A | 6/1996 | Kosalos ........................ 367/13 |
| 5,548,562 | A | 8/1996 | Helgerud et al. ............. 367/14 |
| 5,615,170 | A | 3/1997 | Chelminski .................. 367/15 |
| 6,061,635 | A | 5/2000 | Barber, Sr. ................... 702/14 |
| 6,081,765 | A | 6/2000 | Ziolkowski ................. 702/17 |
| 6,510,270 | B1 | 1/2003 | Toth et al. ................... 385/129 |
| 6,525,658 | B2 * | 2/2003 | Streetman et al. .......... 340/517 |
| 2002/0196140 | A1 | 12/2002 | Streetman et al. .......... 340/523 |

OTHER PUBLICATIONS

M. H. Safar; *Calibration of Marine seismic Sources Using a Hydrophone of Unknown Sensitivity*, Geophysical Prospecting, vol. 24, pp. 329–333, 3 Figs., 1 Table.

* cited by examiner

Primary Examiner—Ian J. Lobo
(74) Attorney, Agent, or Firm—Madan, Mossman & Sriram, P.C.

(57) ABSTRACT

A graphical user interface (GUI) and control system for marine seismic data acquisition is described along with a method of real-time quality control of the seismic survey. The control system includes real-time data processing of individual source near-field measured signals and concurrent synthesis of array far-field signatures. The control system determines individual source out-of-specification conditions and computes far-field signatures based on an array configuration excluding the failed source. Source, array, and troubleshooting information are presented to a user in real-time over a GUI monitor to allow informed decision-making regarding continued and/or modified survey operations and operational parameters.

16 Claims, 11 Drawing Sheets

MARINE SEISMIC SURVEY APPARATUS WITH GRAPHICAL USER INTERFACE AND REAL-TIME QUALITY CONTROL

CROSS-REFERENCE TO RELATED APPLICATIONS

This application is related to provisional patent application No. 60/363,984 filed on Mar. 14, 2002, and to U.S. Pat. No. 6,788,618 titled "Method and Apparatus for Marine Source Diagnostics" filed on Feb. 18, 2003, the entire contents of each application are hereby incorporated herein by reference.

BACKGROUND OF THE INVENTION

1. Field of the Invention

This invention relates generally to marine seismic surveys and more particularly to a method and apparatus for synthesizing and analyzing the output response of an air-gun array and for displaying information to a user for real-time quality control of a seismic survey operation.

2. Description of the Related Art

In marine seismic surveying, to obtain geophysical information relating to the substrata located below the sea bottom, seismic sources, generally acoustic transmitters, adapted to produce pressure pulses or shock waves under water, are towed beneath the water surface behind a marine vessel. The shock waves propagate into the substrata beneath the sea where they are reflected back to the sea. Sensors (usually hydrophones) are used to detect the returning shock waves and to output signals indicative of the detected wave. The signals are processed to generate useful data and to determine the geophysical structure of the substrata.

Air guns or gas guns are frequently used as acoustic transmitters. Usually, several air guns are placed in spaced relation to each other in an array. One or more air gun arrays are towed behind a marine vessel beneath the sea surface. During operation, all air guns in an array are activated simultaneously to produce a desired overall pressure pulse from that array. The pulse characteristics, such as the frequency, bubble ratio and amplitude, of the overall pressure pulse produced by an air gun array is a function of the characteristics of the pressure pulses produced by the individual air guns and the physical arrangement of the air guns in that air gun array and of each gun in that array.

Usually, a shipboard central controller controls the array, and the controller is coupled to the array by an umbilical leading out to the array. Shipboard controllers have been improved over the years to help ensure simultaneous activation (or firing) of the air guns. One such system is described in U.S. Pat. No. 4,757,482 to Fisk and having the title "Modular Airgun Array Method, Apparatus and System", the '482 patent. That patent describes an air gun control system having a central controller on the ship with a data bus leading to several sources aligned in an array and towed behind the ship. The controller of the '482 patent provides some in-water control features by the use of a plurality of local control modules that perform power conversion and are individually addressable by the shipboard central controller.

Marine seismic surveyors have several goals for managing energy source output. One goal is to maximize the energy output of the seismic source array. Another goal is to maintain the array operational characteristics within a predetermined set of specifications or limit conditions. Energy produced by a source array is maximized by maintaining the proper timing of array elements and by monitoring individual elements for out-of-tolerance conditions. The term "array" refers to multiple air guns activated simultaneously. The term "element" refers to a single air gun. The term source or acoustic source as used herein generically refers to either a single air gun or to an array of air guns.

Timing is problematic with typical source systems that control timing from the acquisition vessel. A telemetry cable that extends from the vessel to the source element acts as a filter in the system and it limits the operator's ability to precisely control element timing. Source elements that are not precisely timed will produce energy that interferes and reduces the overall array output. Moreover, data signals returning from hydrophone acoustic sensors will also suffer from the same imprecision.

System operators normally use assumptions about a source array signature when processing seismic data signals to recover the true reflectivity of the subsurface by suppressing distortions. The usual processing methods use deconvolution techniques, which are adversely affected when initial assumptions are inaccurate. Therefore, as an array output degrades due to timing or element errors, the initial assumptions become less accurate and thus reduce the reliability of the processed data signals.

Another problem with the typical prior art system is that element failure often reduces operational effectiveness. A failed source in an array adversely affects initial assumptions by changing the array combined output pulse. If detected, the operator might continue operation with a small number of failures, but this reduces data quality. Also, the operator might install spare elements in the array to activate subsequent to the failure, but this adds cost to the survey operation. Ultimately, the operator might be forced stop production to retrieve and repair the source array, resulting in significant efficiency losses.

These and other problems with the typical seismic survey system create a need for an apparatus and method for determining real-time an array health status from which the operator can make an informed real-time decision for continuing a survey with a failed element. As used herein, the term real-time means any course of action or activity during a seismic survey.

The typical system also suffers from an inability to provide information useful in predicting system response given a potential failure. Therefore, the need exists for predictive array synthesis that takes element failure into account. Such array synthesis will allow an operator to predict array performance with one or more elements removed from the array and to determine if the array would remain within specifications given the removed elements.

Yet another problem associated with the typical system is that the operator needs an improved interface for effectively controlling the array in view of potential failures. Current seismic survey systems do not provide a graphical user interface having real-time status reporting, quality control reporting, or troubleshooting tips for use during the survey.

SUMMARY OF THE INVENTION

The present invention addresses the above-identified drawbacks by providing a seismic data acquisition system having improved graphical user interface, prediction control through array synthesis, and real-time source monitoring and correction.

In one aspect of the invention a seismic survey information presentation device is provided for use with a seismic survey system including one or more acoustic sources. The device includes a computer having a processor for processing information according to one or more programs, a display device for displaying the processed information, an information input device for providing a user entry point into the information presentation device, the processor, display device and information input device being a graphical user interface, one or more sensors associated with the seismic survey system operatively coupled to the computer for transferring real-time survey information to the computer, and a plurality of modules in the computer for comparing survey derived parameters relating to an acoustic source signature to predetermined parameters relating to the acoustic source, wherein the comparison is reported to a user on the display during the seismic survey, the comparison being used at least in part in determining a course of action.

In another aspect a baseline signature represents one of bubble period, bubble amplitude and frequency and a real-time comparison is made based on real-time measurements.

The baseline signature can be a measured near-field air gun output or a synthesized far-field array output based on predetermined initial parameters. When the baseline signature represents a near-field output, the second signature preferably represents a near-field output. When the baseline signature is a synthesized far-field signature, the second signature is a synthesized far-field signature based on survey derived parameters. The signatures can be in a time domain and/or a frequency domain.

Still another aspect of the present invention is a troubleshooting module in the plurality of modules. The troubleshooting module uses the comparison in determining an out-of-tolerance condition and provides pre-planned troubleshooting tips to the user in real-time to aide in determining the next course of action.

BRIEF DESCRIPTION OF THE DRAWINGS

The novel features of this invention, as well as the invention itself, will be best understood from the attached drawings, taken along with the following description, in which similar reference characters refer to similar parts, and in which.

DETAILED DESCRIPTION OF THE INVENTION

Figure 1A:
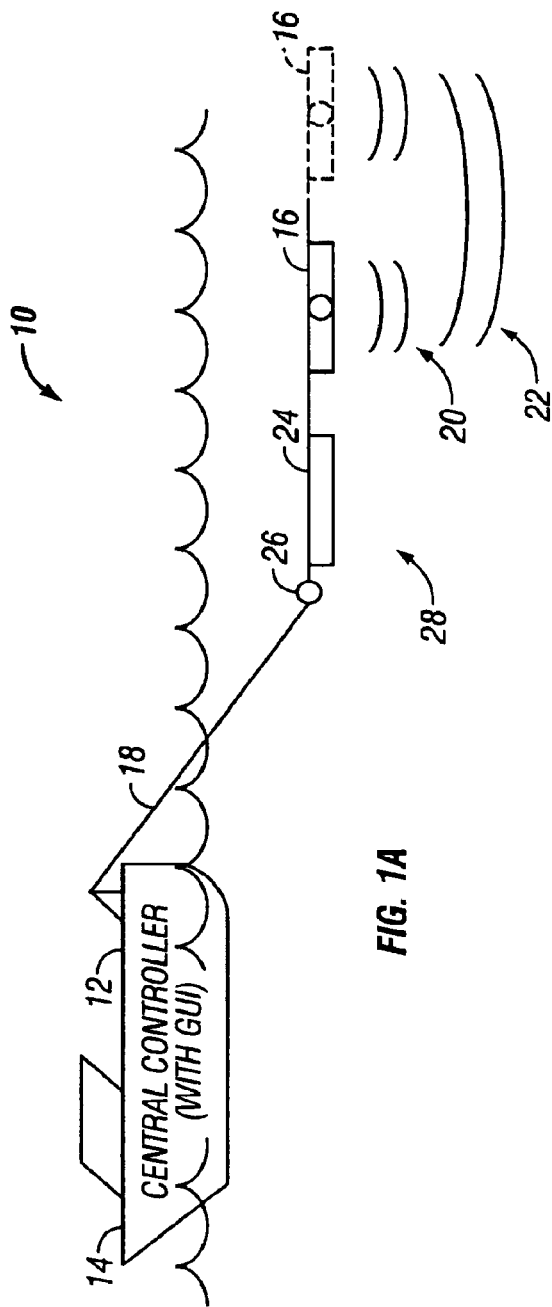
FIGS. 1A and 1B show a marine seismic data acquisition system according to the present invention.
Figure 1B:
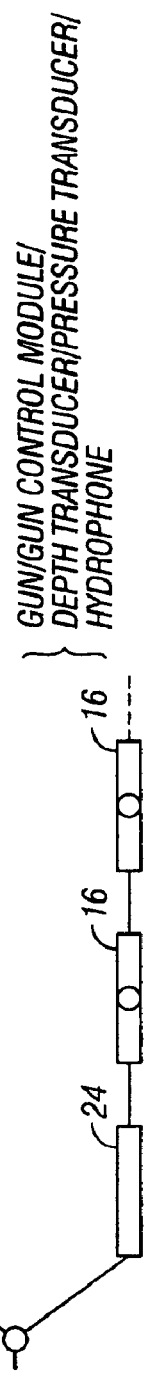

FIGS. 1A and 1B show a marine seismic data acquisition system 10. Shown is a tow vessel 12 that includes a central controller 14. As described later, the controller 14 includes a computer and graphical user interface. An air gun array 28 is coupled to the vessel by a reinforced cable 18 and known coupling 26. The cable 18 includes conductors for coupling the array sources to the central controller. The array comprises several individual acoustic sources 16. When activated, each source produces an air bubble 20, and the individual sources are activated such that the several air bubbles coalesce to form a substantially singular acoustic wave 22. An in-water remote control module 24, which will be further described later, preferably controls each array string.

Figures 1C, 1D:
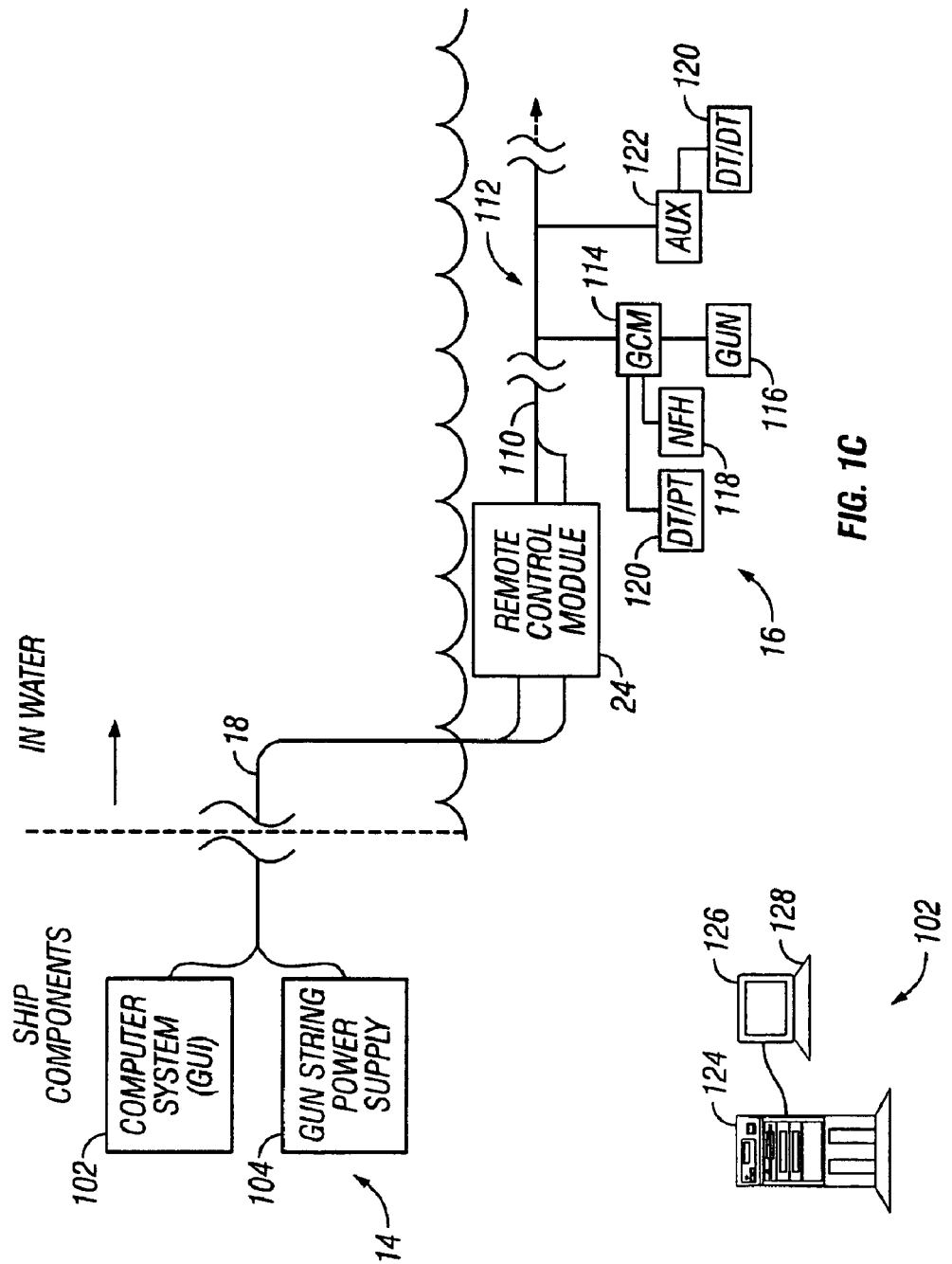
FIG. 1C is a system block diagram that represents the system of FIGS. 1A and 1B.
FIG. 1D shows a computer system used for the GUI of the present invention.

As shown in FIG. 1B, each source comprises several components according to the present invention. Shown are two substantially identical source array strings. Each string includes preferably only one remote control module 24 the array string. Referring to FIGS. 1B and 1C, a source element includes a gun control module 114 for controlling the individual source, a hydrophone sensor 118 for acquiring a near-field response from each source, a depth transducer for acquiring depth information, and a pressure transducer for acquiring pressure information. The depth and pressure transducers being shown collectively as a DT/PT module 120.

The central controller 14 includes a memory unit (not separately shown) for storing baseline element signatures as well as signatures acquired during the seismic survey. For the purposes of this invention a signature is a signal indicative energy associated with an air gun output or with an array output. The signal can be measured or synthesized. A graphical user interface according to the present invention is included for allowing an operator to view system and element status and for commanding the system from the vessel. As used herein, an element signature means information representative of a source element response characteristic. The signature can be a single source signature or the signature can be a combination of signatures from an array of single sources. The signature can be a near-field signature or the signature can be a far-field signature. Furthermore, the signature can be measured, computed or synthesized using methods according to the present invention.

FIG. 1C is a system block diagram that represents the system 10 of FIGS. 1A and 1B. The system includes out-of-water (or shipboard) components and towed in-water components. Shipboard components include a graphical user interface (GUI) computer 102 and a power supply 104. The use of the term "shipboard components" is for simplicity and not indicative of a requirement that any particular component be on a ship. For example, one aspect of the present invention includes a network interface that transmits seismic data to a remote location such as in a land-based office to be viewed on a GUI monitor. The power supply 104 is preferably a known supply used for converting alternating current (ac) power to direct current (DC) power.

The interface 102 and power supply 104 are coupled to in-water components via the umbilical 18. The umbilical 18 is connected to the array 28. The remote control module 24 is coupled via a second umbilical 110 to one or more source elements 16.

In a preferred embodiment, the shipboard interface communicates with a navigation system and provides global synchronization to in-water components to be described later. The shipboard interface provides a data collection point for source array elements and peripheral sensors, and it provides an operator entry point for control of source array elements.

The array 18 includes a plurality of air gun control modules 114 (only one is shown for simplicity), and each gun control module is connected to and controls at least one air gun 116. The gun control module (GCM) is also connected to one or more near field hydrophones 118 and one or more depth/pressure transducers 120 (DT/PT modules). The array may include an optional auxiliary unit 122 when additional DT/PT modules are desired.

FIG. 1D shows a one embodiment of the computer and the GUI of the central controller 14 of the present invention. The central controller preferably includes a computer 124, a monitor 126 and a keyboard 128. As in most typical computers, the computer 124 includes an internal processor, memory devices for storing information obtained during the survey and for storing one or more programs having instructions for use by the processor. The processor is preferably used to synthesize signals and to compare synthesized signals as well as to analyze and compare measured signals received during the survey. These aspects of the present invention will be further described herein with respect to FIG. 5.

Figure 2:
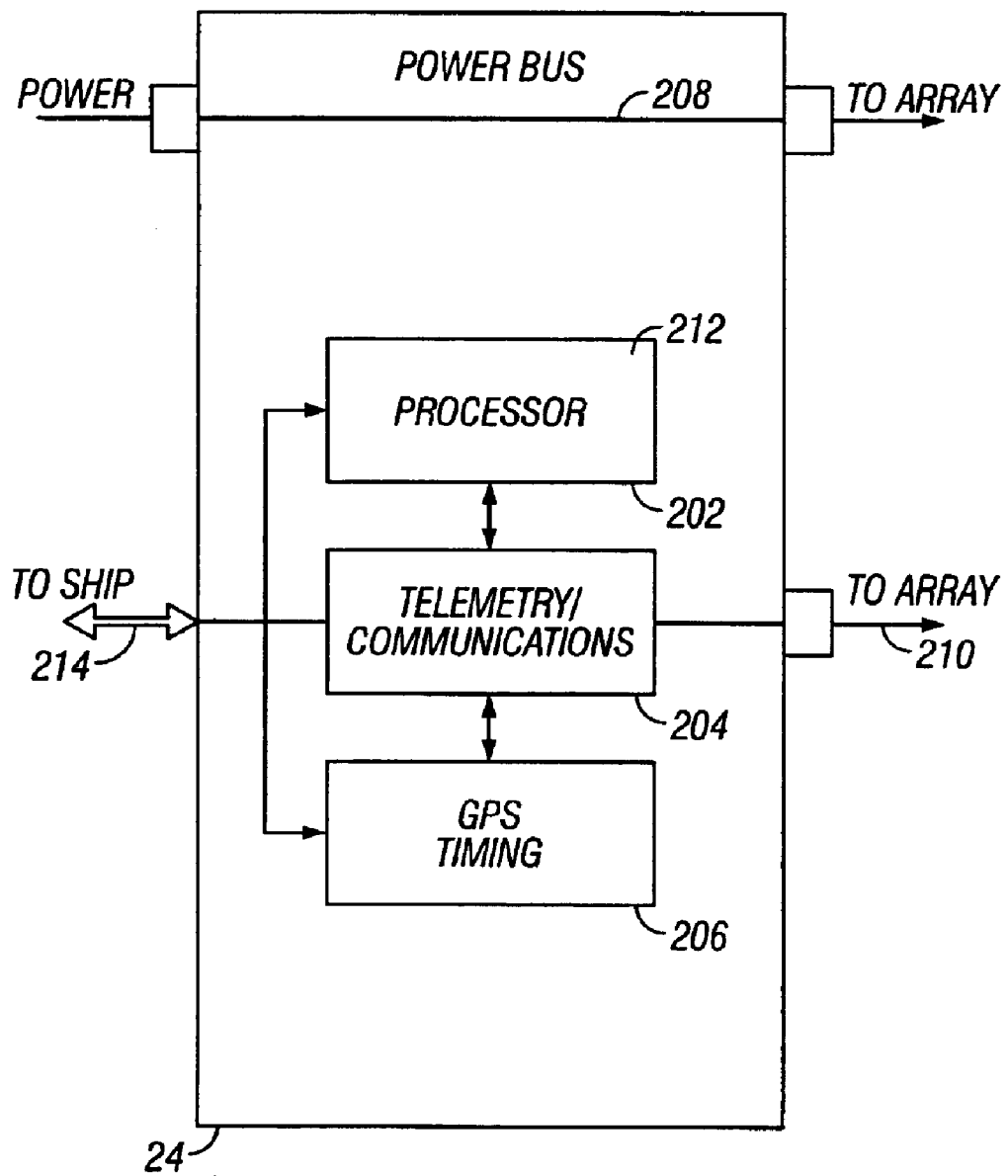
FIG. 2 is a block diagram of an embodiment of the remote control module of the present invention.

FIG. 2 is a block diagram of the remote control module (RCM) 24 used as part of system 10 described above and shown in FIG. 1C. The RCM 24 includes a processor 202, a telemetry communication module 204 and an optional global positioning system (GPS) timing signal receiver 206. In a preferred embodiment, DC power is generated on ship using the power supply 104 as described above and shown in FIG. 1. The RCM 24 preferably passes the DC power using a power bus 208, and the power bus 208 distributes the DC power along the array.

The RCM processor 202 may be any number of known processors and may include a memory module 212 for storing received parameters and data. The processor 202 is coupled to the telemetry module 204. The processor is coupled to the GPS signal receiver 206 for use when precise positioning is necessary as will be discussed later. The telemetry module is coupled to the shipboard interface 102 via a communications link. The telemetry module 204 is also coupled to the processor 202 and GPS receiver 206. All internal couplings are typical electrical couplings known in the art.

Figure 3:
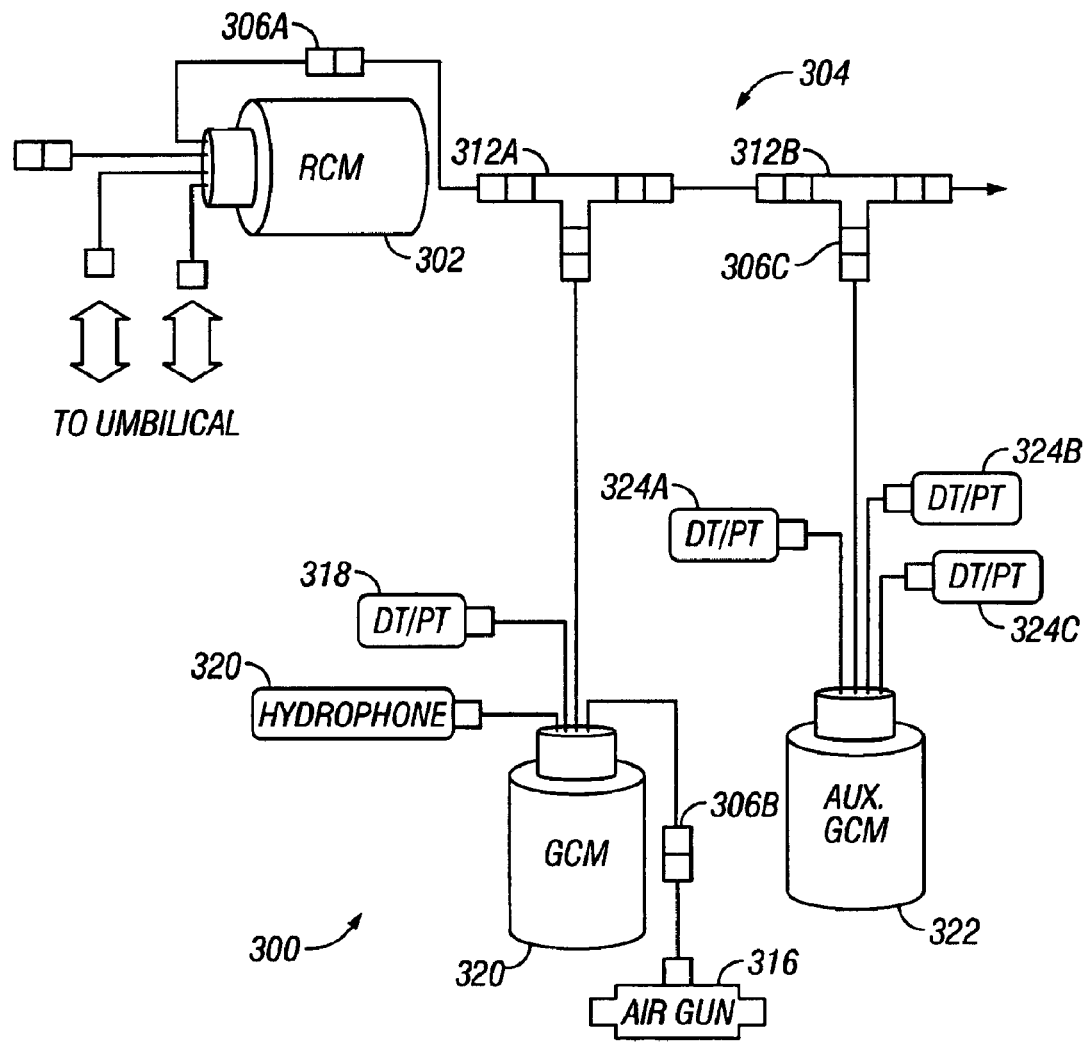
FIG. 3 is a block diagram to show in greater detail the in-water components used in the system of FIG. 1.

FIG. 3 is a block diagram to show in greater detail a preferred arrangement of the in-water components used in the system of FIG. 1. The several components shown in FIG. 3 are referred to collectively as the towed subsystem 300. The towed subsystem 300 includes a remote control module (RCM) 302 substantially identical to the RCM 24 described above and shown in FIGS. 1 and 2. The RCM 302 is coupled to an array 304 using any suitable connector 306a to connect an array umbilical 308. The array umbilical 308 couples the RCM 302 to a plurality of branches 310a–310b using known T-connectors or any other suitable known connector.

A gun branch 310a includes a gun control module (GCM) 314. The GCM 314 is coupled to a known air gun 316. The GCM 314 is coupled to a depth/pressure transducer module 318. The GCM is coupled to a hydrophone 320.

Each GCM is a distributed controller for source array elements. Each GCM includes digitizing circuitry for digitizing signals at or near the acoustic source location. This local digitization reduces adverse noise effects and increases upstream processing capability. In a preferred embodiment, each GCM is used to digitize signals from peripheral sensors elements such as the DT/PT modules.

Each GCM provides power to the source element and acts as a single bus between control units and all source elements, which reduces the number of conductors required for operation.

An auxiliary branch 310b is used to expand the capabilities of the gun branch 310a. As such, the auxiliary branch is completely optional. When used, the auxiliary branch 310b preferably includes an auxiliary GCM 322. The auxiliary GCM is coupled to one or more depth/pressure transducer modules 324a–c. The auxiliary GCM is similar to the GCM in that the auxiliary GCM operates to digitize output signals from the auxiliary branch peripheral sensor elements such as the DT/PT modules 324a–c.

Referring now to FIGS. 4–8 and utilizing the embodiments described above and shown in FIGS. 1A–3, real-time acoustic source testing embodiments and graphical user interface (GUI) embodiments according to the present invention will be discussed.

Figure 4:
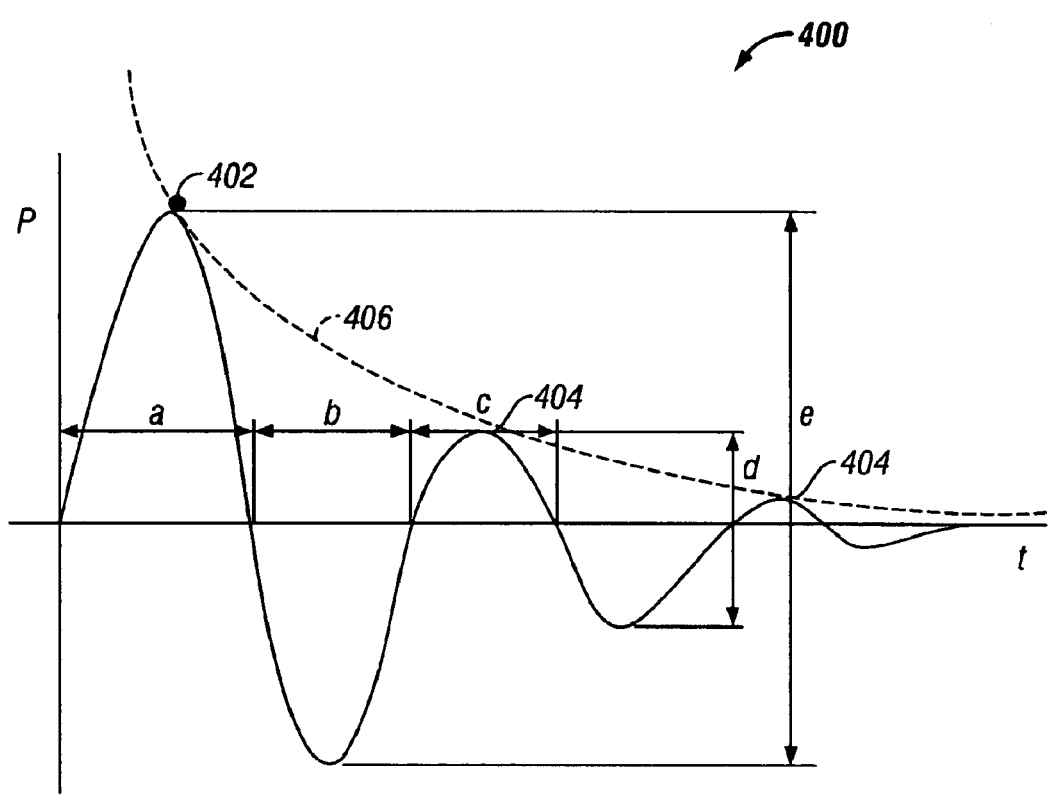
FIG. 4 is a plot of a typical air gun response.

FIG. 4 is a graphical representation of a typical air gun response shown as amplitude plotted against time. When an air gun is activated, a peak amplitude 402 is usually exhibited followed several successively decaying peaks, or so-called bubble amplitude peaks 404. An air gun operating within normal parameters will usually exhibit an asymptotic peak decay curve shown as a dotted line 406. The curve is a diminishing sinusoid with a period T 408 being, for example, (a+b) or (b+c). The positive peak amplitude is typically indicative of a direct output while the negative peak amplitude typically includes surface reflection energy usually present in the measurement. Those skilled in the art understand the effect of reflection energy on peak-to-peak measurements and understand how to compensate measured data. Thus, the terms peak and peak-to-peak might sometimes be used interchangeably. A measured response characteristic that deviates significantly from the typical response curve might be indicative of problems with the air gun, the receiver hydrophone or both. For example, a wide variation in the period T is usually indicative of a problem with the air gun, whereas a variation in the amplitude response can be indicative of a problem with the gun or the hydrophone or both.

Since the problem cause is sometimes difficult to determine, the typical operations procedure would have the survey halted to replace the air gun and/or the hydrophone. This is because the typical system does not provide any indication as to the acceptability of continuing the survey with a failed gun and/or hydrophone. If the operator simply continues the survey, there is no measure or guarantee of the accuracy of the future survey data, thus diminishing the value of the survey.

The present invention provides a real-time test apparatus and procedure that uses a known response in conjunction with real-time measurement for determining the effectiveness of the array with a failed gun and or gun/hydrophone pair. Each air gun in the array of the present invention is initially tested to create an initial response characteristic signature such as the response shown in FIG. 4. The signature is known as a near-field signature, and is used for the purposes of the present invention. Preferably, the hydrophones used in the array are used in measuring individual air gun signatures. The signatures are stored as near-field baseline data in the memory device for later comparison to real time responses from the air gun elements as will be discussed in more detail later.

The initial measured air gun response provides information about the health and performance of the air gun when compared to an ideal. The response of each air gun is preferably represented in the time domain as shown. A period of each response is determined and archived for later comparison to real-time response signals. Changes in the response period tend to indicate a problem with the air gun. The initial archived signal also includes peak amplitude. Real-time response signals are compared for peak amplitude variations. Amplitude exceeding acceptable operational limits (maximum or minimum) tends to indicate a problem with the hydrophone or air gun.

Figure 5A:
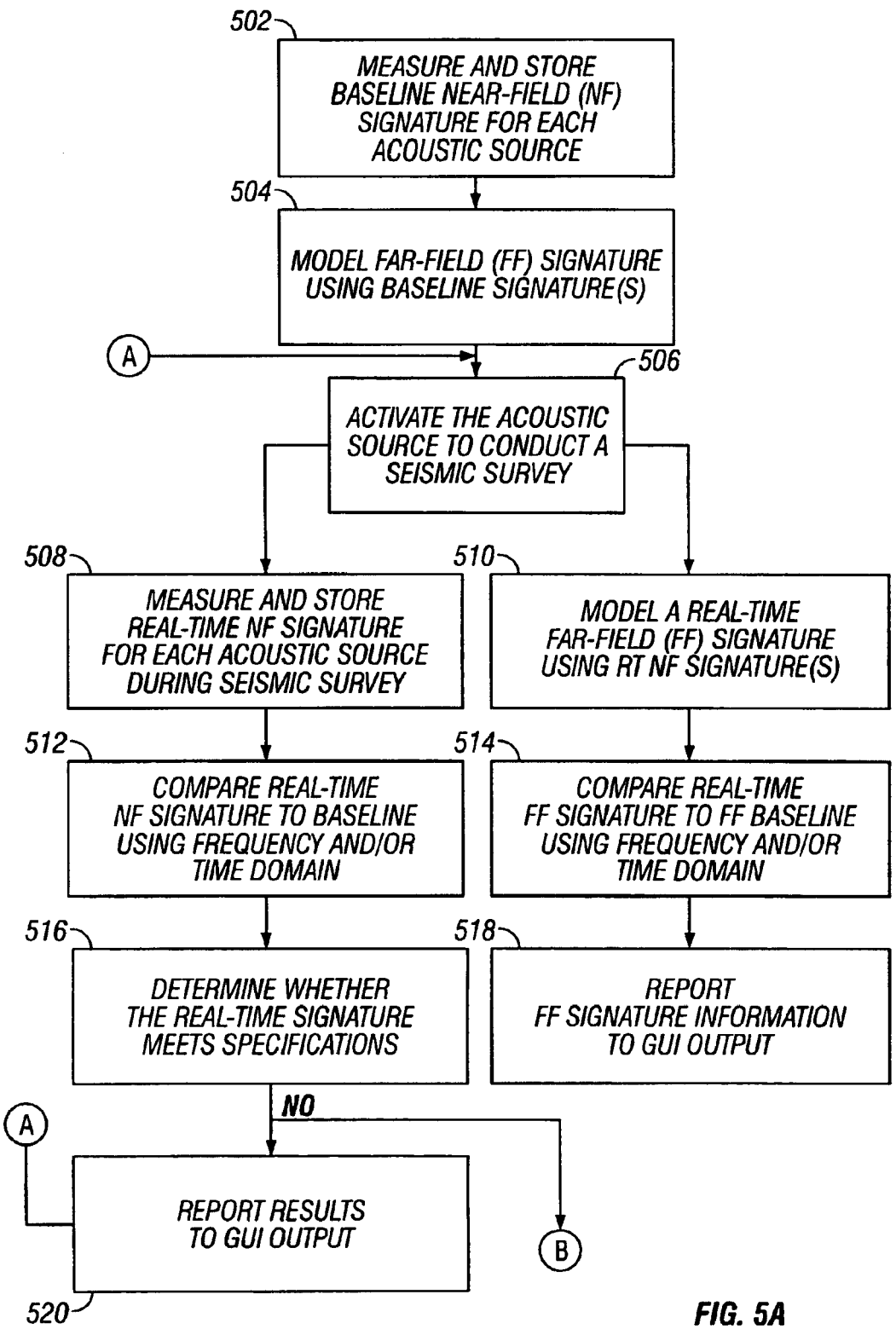
FIGS. 5A and 5B show a flow diagram of a method according to the present invention.
Figure 5B:
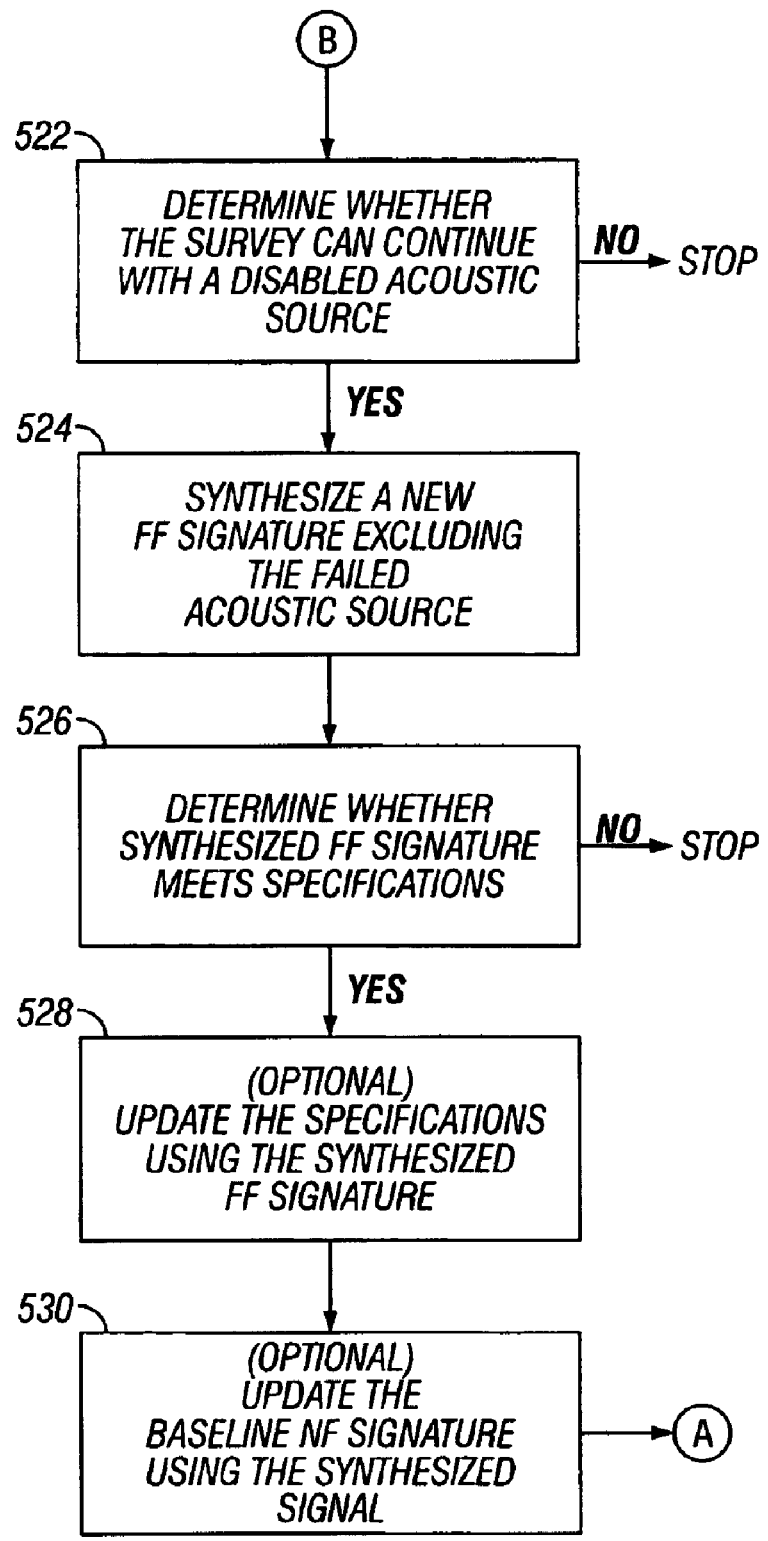

FIGS. 5A–5B show a method according to the present invention that provides concurrent near field quality control and far field signature synthesis during a seismic survey. The flow shown is for ease of explanation and is not intended as limiting the invention to any particular order of steps.

The method begins by storing initial information in the central controller for use in later comparisons and by activating each element to measure and store a baseline near-field (NF) signature for each element 502. The initial information preferably includes the particular seismic survey array configuration, e.g., number of strings, number of guns per string, gun identifier etc . . . The information preferably includes tolerance information derived from component specifications as well as particular customer requirements. Other useful information used for synthesizing far-field (FF) signals and for NF and FF signal comparisons include gun volume, timing, temperature, depth, atmospheric pressure, water pressure, and the like. The initial information is based on expected values for these parameters, while sensors as described above are used to acquire real-time information relating to the same parameters. The present invention contemplates as initialization information as being any desired information to be used to compare survey information for quality or to compare any component or subsystem operating parameter for quality.

A far-field (FF) signature (signal) is synthesized 504 based on the actual array configuration and on initial parameters and assumptions above. The synthesized FF signature is stored for later comparison to real-time synthesized FF signatures derived during the seismic survey using the measured parameters and constant known parameters.

The survey begins by activating all sources 506 as is typical in the art. At each activation, commonly referred to as a "shot", a new NF signature is acquired 508 using near field hydrophones. Information associated with the shot is acquired. This survey derived information is acquired through in-water sensors, e.g., the DT/PT 120, temperature sensors, atmospheric sensors, GPS devices, etc . . . Other information relating to the array configuration and individual hydrophones is acquired and stored in the central controller memory for processing.

The newly acquired NF signatures (signals) are compared to the NF baseline, and a new FF signature is synthesized 510, based on the information acquired during the survey.

Preferably in a concurrent fashion, the newly-acquired NF signatures are compared with the baseline signatures and the new FF signature 512 is compared to the original FF signature 514. The NF signatures are preferably compared in the time domain for comparing amplitude peaks and zero crossings with the baseline signatures for the corresponding source. Additionally, the NF signature is compared in the frequency domain by measuring the first harmonic of the signature and comparing the measured first harmonic with the first harmonic of the baseline signature of the corresponding source. Substantially similar comparisons are conducted with the FF synthesized signature and the stored FF signature.

The FF signature comparison is then reported 518 via the GUI monitor in substantially real-time, while further processing is performed on the measured NF signatures.

The method includes determining whether the each source is operating within predetermined specifications 518, based on the compared frequency and/or amplitude comparisons relating to the NF signatures. If all comparisons show that the guns are operating within specification, then the survey can continue with the comparison results being reported 520 via the GUI monitor.

When any particular acoustic source is not operating within specification, the method of the present invention allows for real-time assessment of continued operations with one or more failed acoustic sources. The newly-measured signatures are used to determine the survey can continue without using the failed sources 522. In this case, the new FF signature is synthesized 524 using the information as described above and with array configuration information revised to exclude the failed elements. The new synthesized FF signature is compared to FF signature specifications 526 and to the previously synthesized FF signature for real-time informed decision-making regarding continued operations. In some cases, the new synthesized signature might indicate that the missing sources will not adversely affect the quality of the survey, and the survey can continue by not activating the failed sources. In other cases, the new synthesized signature might indicate that further survey operations are not advisable due to expected poor quality.

In some cases, the NF comparison and FF comparison (with or without excluded elements), might show array drift. Array drift is a known condition whereby substantially all acoustic source NF signatures are altered in generally the same way. It is possible that some or all of the sources fail a specification, but the synthesized FF signature might indicate that useful data can be acquired by continued operations. In this case, the user has the option to update the specifications 528 and/or NF baseline signature using the new synthesized FF signature taking into account the drift conditions. This allows the survey to continue with the change in specifications being recorded for later evaluations. When this option is selected, the baseline signature 530 and associated specifications can be updated in real-time without halting the survey and retrieving the array.

Figure 6:
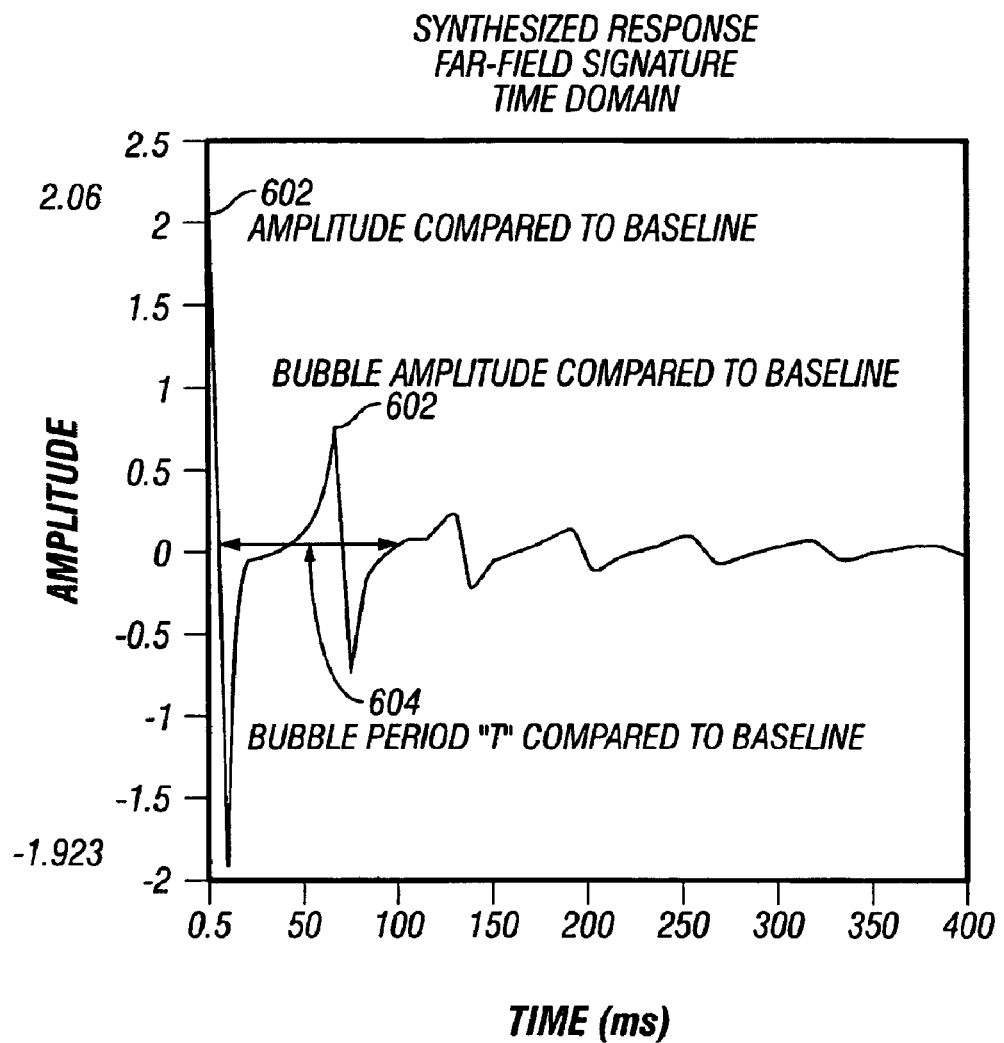
FIG. 6 is an acoustic source far-field signature (FFS) shown in the time domain.

FIG. 6 represents a synthesized far-field response signature generated by the method of the present invention as described above and shown in FIGS. 5A–B. The response is shown in the time domain to illustrate certain comparisons made using the method. The far-field source peak response 602 is compared to the initial FF response signature synthesized prior to beginning the seismic survey. In addition to the peak response, the signature period "T" 604 and bubble amplitude 606 are concurrently compared to the corresponding baseline parameters. The curve, comparisons and any detected error are recorded and reported to the user in real time using the monitor of the GUI controller according to the present invention. In this manner, the user can determine from the signature response and displayed messages, whether the far-field signature meets specifications or whether the survey should be halted.

Figure 7:
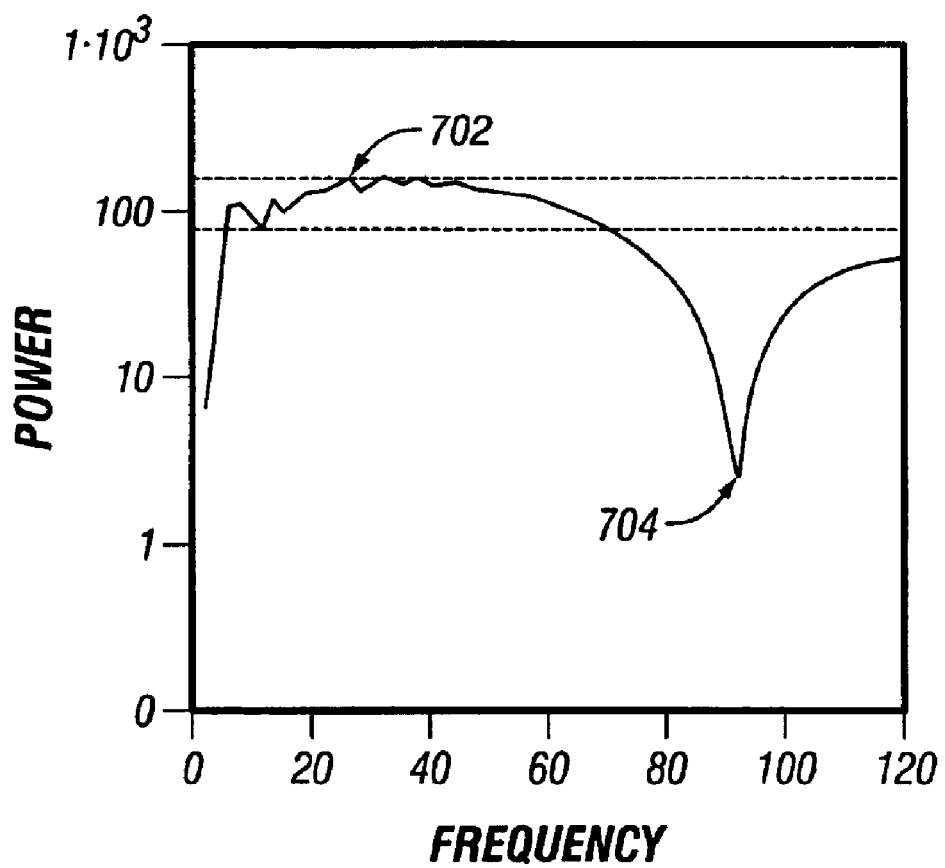
FIG. 7 is an acoustic source far-field signature (FFS) shown in the frequency domain.

FIG. 7 represents a synthesized far-field response signature generated by the method of the present invention as described above and shown in FIG. 5. The response is shown in the frequency domain to illustrate certain comparisons made using the method. Using the frequency domain allows for comparing far field power magnitude 702 and power spikes 706 to corresponding power/frequency specifications determined at the beginning of the survey. The comparison is useful in determining quality of the far field signature in real-time.

Figure 8A:
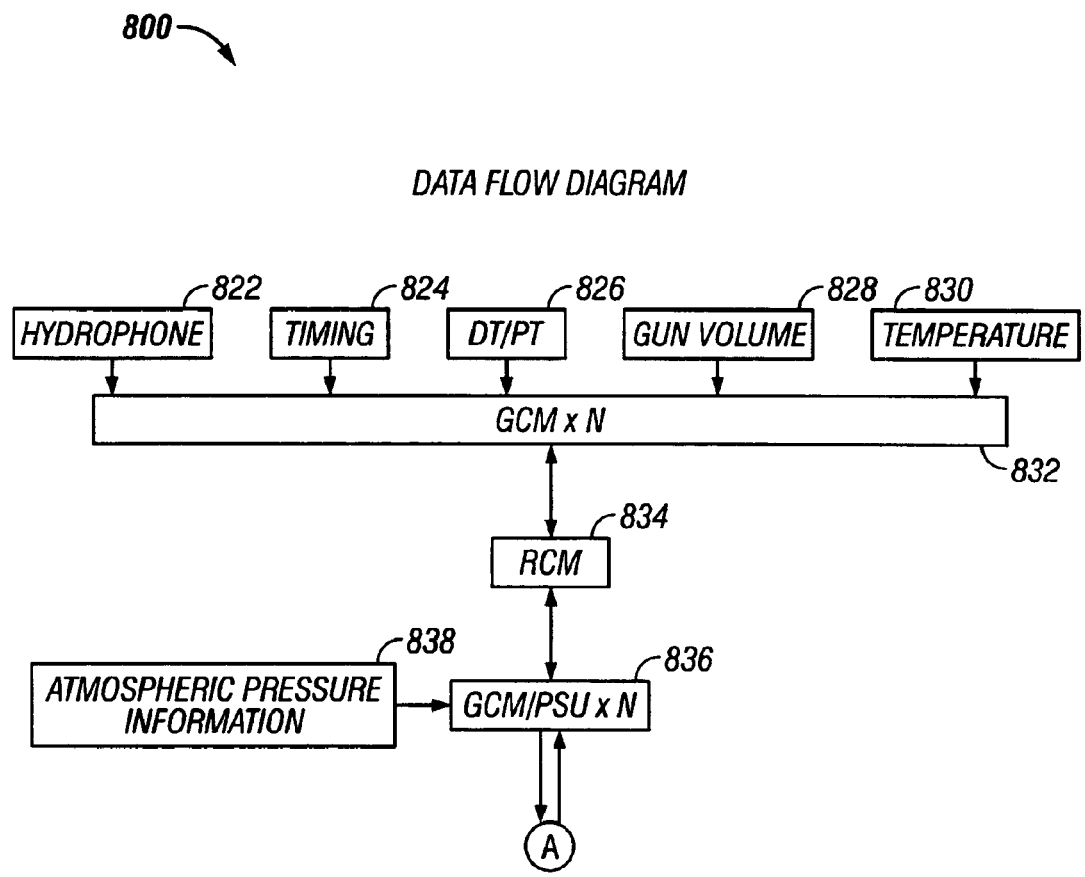
FIGS. 8A–8B show a data flow diagram of a GUI control system according to the present invention.
Figure 8B:
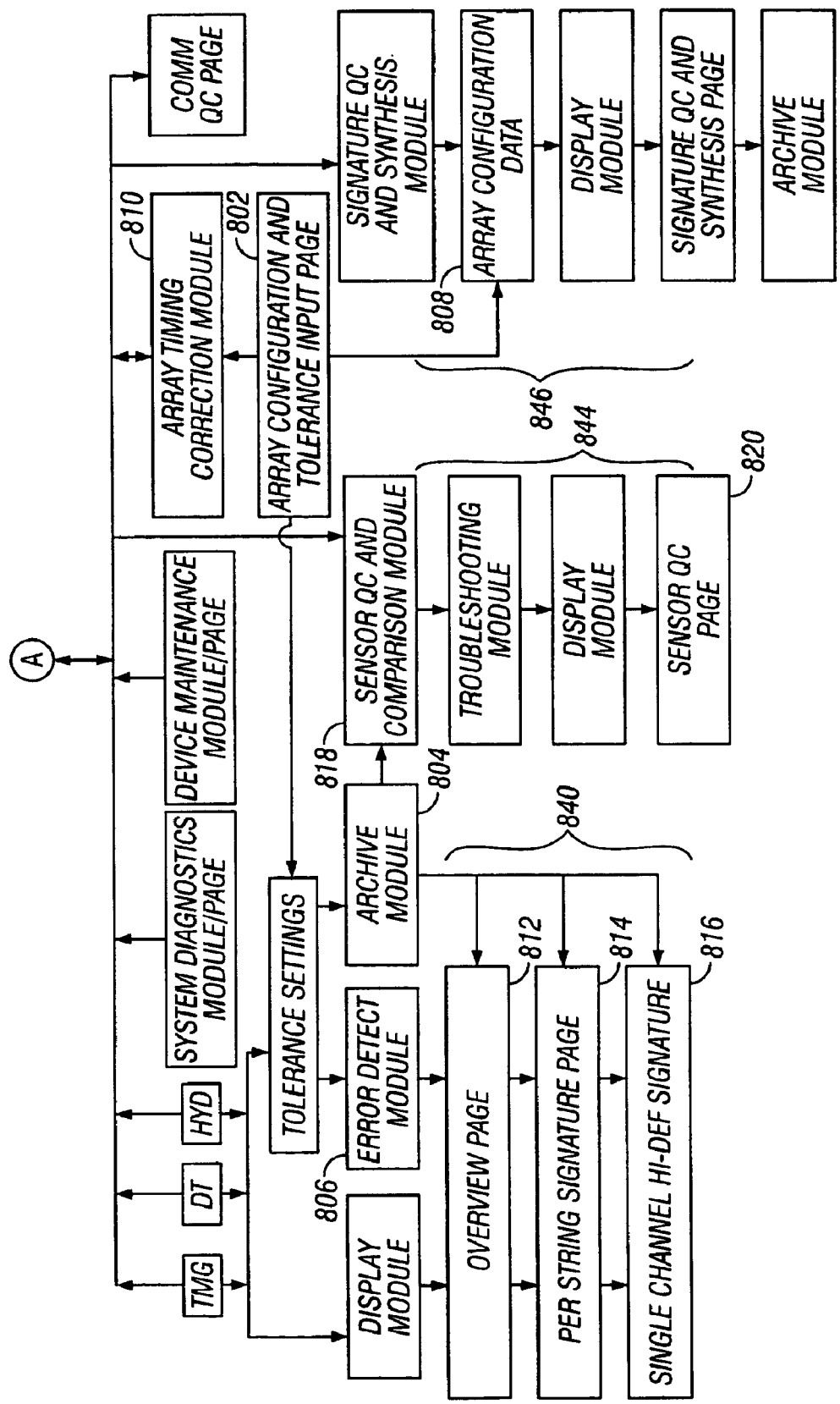

FIGS. 8A–8B show a data flow diagram 800 of a GUI according to the present invention to illustrate a preferred method of information flow and display using a controller and quality control (QC) apparatus according to the present invention. References to the apparatus described above and shown in FIGS. 1A–3 are made to simplify the discussion. Those skilled in the art and with the benefit of the present disclosure would recognize the availability of several commercial configurable software products that might be programmed with instructions to carry out the method of information flow and display according to the present invention.

For the purposes of this disclosure a graphical user interface (GUI) is used to mean either a device for allowing a human to interact with a seismic survey system or a set of programmed instructions to be carried our by a computer processor to receive commands from a user through an input device and to provide a graphical output to a user over a display. The term module as used with the GUI described below means a subset of programmed instructions to perform a specified function. The term screen as used with the GUI described below means a set of programmed instructions to provide a graphical output over a display, the output being representative of the function described.

The survey system 10 is initialized with information entered into an Array Configuration and Tolerance Input Page 802 preferably using a GUI input device such as a computer keyboard, scanner, download, or the like. The information preferably includes the particular seismic survey array configuration, e.g., number of strings, number of guns per string, gun identifier etc . . . The information preferably includes tolerance information derived from component specifications as well as particular customer requirements. The present invention contemplates as initialization information as being any desired information to be used to compare survey information for quality or to compare any component or subsystem operating parameter for quality. For the purposes of this invention, the terms "quality" and "quality control" are used and generally used in the art. That it, the terms relate to whether a particular parameter is determined to meet acceptable specifications.

Initialization information is then transferred to modules in the GUI controller 102 of FIG. 1C. The controller information is arranged in a controller group 840 and a source quality group 842. The source quality group is further shown as a near field quality and comparison group 844 and a far field quality and synthesis group 848. Tolerance information is transferred to an archive module 804 as baseline information and to an error detection module 806. Information relating to array configuration is transferred to the archive module 804, and to an array configuration module 808, which is used in real-time far-field signature display and reporting. The initialization information is also transferred to an Array Timing Correction Module 810, used for shot timing control.

Initialization information is preferably available to a user on a GUI monitor in the form of information pages. The baseline information and tolerance settings are displayed globally on an overview page 812. Initial information might also be displayed as string information on a per-string information page 814, and gun information can be displayed on a single-channel high-definition page 816.

The baseline information is transferred from the archive module 804 to a Sensor QC and Comparison Module 818 for use during real-time near-field quality control.

Once the system is initialized with user input information as described above, initial measured information comprising near-field signature information is transferred as baseline information in the archive module 804, in the error detect module 806, in the Sensor QC and Comparison module 818 and to the array timing and correction module 810. All of which information is displayable to the user on the GUI monitor as a Sensor QC page 820.

During each shot, information acquired by the various sensors described above and shown in FIG. 3 preferably flows according to FIGS. 8A and 8B. Hydrophone information 822, timing information 824, depth and pressure information 826, gun information 828 and temperature information 830 flow to the gun control module 320 and is collectively referred to as GCM information 832. GCM information also includes information such as commands and GPS timing signals flowing to the GCM 302 from the GUI controller 102. Information from several gun control modules and auxiliary control modules flow to the RCM 302 and is collectively referred to as RCM information 834. RCM information 834 also includes information such as commands flowing to the GCM and other information desirable in controlling the string.

Information regarding each shot flows as RCM information to a recording room as GS/PSU information 836. Atmospheric pressure information 838 is preferably acquired at the time of each shot using known acquisition devices and methods. The atmospheric pressure information 838 includes the atmospheric pressure occurring at the time, and in the location of the shot. The information is transferred to the GS/PSU for recording along with the GCM information 832 and the RCM information 836 for later review and analysis.

The GS/PSU information 836 is also transferred to the controller 102 for real-time near-field signature QC, and for concurrent far-field signature synthesis and reporting as discussed above and shown in the flow of FIGS. 7A–7B.

The hydrophone, depth and pressure data go into the Sensor QC and Comparison Module for the diagnostic tests described above in FIG. 2 and those results go into the Troubleshooting Module for evaluation of out-of-tolerance conditions. The raw data also go into the signature QC and Synthetic Module along with the array configuration for generation of array synthetics.

Data, such as information relating to individual sources, multiple sources along a string and complete array information are used in real-time quality control and source evaluation.

Referring to FIGS. 6 through 8B the information used and/or obtained during the survey are presented to the operator or other personnel using a plurality of modules in the computer for comparing survey derived parameters relating and the acoustic source signature to predetermined parameters relating to the acoustic source. The comparison is reported for amplitude bubble period and frequency to a user on the display, the comparison being used at least in part in determining a course of action. A course of action might be pulling in the system for repair, continuing the operation next shot, or continuing the operation and modifying the parameters to take into account deviations determined using the comparison.

For amplitude, using a time series signature, as described in FIG. 6, a comparison is made of the peak-to-peak 602 signature, reporting any user defined out of tolerance observations.

For bubble period, using a time series signature, as described in FIG. 6, a comparison is made of the bubble period 604 signature. The comparison is reported to the user along with user defined out of tolerance observations.

For frequency, using frequency information derived from a time series signature, a frequency observation described in FIG. 7 is generated. Comparisons are made based on the area beneath the frequency curve 702A and 704A, for all points greater than −6 dB. User defined out of tolerance observations are reported.

The foregoing description is directed to particular embodiments of the present invention for the purpose of illustration and explanation. It will be apparent, however, to one skilled in the art that many modifications and changes to the embodiment set forth above are possible without departing from the scope of the invention. It is intended that the following claims be interpreted to embrace all such modifications and changes.

What is claimed is:

1. A seismic survey information presentation device for use with a seismic survey system including one or more acoustic sources, the device comprising:
   a) a computer having a processor for processing information according to one or more programs;
   b) a display device for displaying the processed information;
   c) an information input device for providing a user entry point into the information presentation device, the processor, display device and information input device being a graphical user interface;
   d) one or more sensors associated with the seismic survey system operatively coupled to the computer for transferring real-time survey information to the computer;
   e) a plurality of modules in the computer for comparing survey derived parameters relating to an acoustic source signature to predetermined parameters relating to the acoustic source, wherein the comparison is reported to a user on the display during the seismic survey, the comparison being used at least in part in determining a course of action.

2. The device of claim 1, wherein the comparison is of a baseline source output amplitude to a real-time source output amplitude.

3. The device of claim 1, wherein the comparison is of a baseline source output bubble period to a real-time source output bubble period.

4. The device of claim 1, wherein the comparison is of a baseline source output frequency to a real-time source output frequency.

5. The device of claim 2, wherein the baseline source output amplitude and the real-time source output amplitude are each a time-series signature and one or more programs include a program for comparing a peak-to-peak parameter of the time-series signature and a program for reporting when determined an out of tolerance condition.

6. The device of claim 3, wherein the baseline source output bubble period and the real-time source output bubble period are each a bubble period signature and one or more programs include a program for comparing the bubble period signatures and a program for reporting when determined an out of tolerance condition.

7. The device of claim 4, wherein the baseline source output frequency and the real-time source output frequency are each a time-series signature and one or more programs include a program for comparing a an area beneath a frequency curve for all points greater than a predetermined value, the one or more programs further including signature and a program for reporting when determined an out of tolerance condition.

8. The device of claim 7, wherein the predetermined value is about −6 dB.

9. A device according to claim 1, wherein the plurality of modules includes a controller group and a source group.

10. A device according to claim 1, wherein the plurality of modules includes a near field quality and comparison module group and a far field quality and synthesis module group.

11. A device according to claim 1, wherein the plurality of modules includes a sensor quality and comparison module used to compare survey-derived information relating to individual acoustic sources to baseline information relating to the individual acoustic sources received from an archive module.

12. A device according to claim 1, wherein the plurality of modules includes a troubleshooting module and a display module, the troubleshooting module containing a suggested course of action to take upon the existence of a failure, the suggested course of action being displayed to a user on the display device using the display module.

13. A device according to claim 1, wherein the survey derived parameters include one or more of gun volume, timing, temperature, depth, atmospheric pressure, and water pressure, the survey derived parameters being acquired during the seismic survey.

14. A device according to claim 1, wherein the plurality of modules includes a response characteristic synthesis module in the computer system for synthesizing a response characteristic based at least in part on at least one disabled acoustic source in a source array.

15. The device of claim 1, wherein the plurality of modules includes a troubleshooting module containing messages relating to one or more out-of-specification conditions, said messages being displayed on the display terminal when said one or more out-of-specification conditions exists.

16. The device of claim 1 further comprising a source controller for controlling the acoustic source, the control being based in part on the comparison.

* * * * *